(12) United States Patent
Crispin

(10) Patent No.: US 10,481,678 B2
(45) Date of Patent: Nov. 19, 2019

(54) INTERFACE-BASED MODELING AND DESIGN OF THREE DIMENSIONAL SPACES USING TWO DIMENSIONAL REPRESENTATIONS

(71) Applicant: DAQRI LLC, Los Angeles, CA (US)

(72) Inventor: Sterling Crispin, Albuquerque, NM (US)

(73) Assignee: DAQRI LLC, Los Angeles, CA (US)

( * ) Notice: Subject to any disclaimer, the term of this patent is extended or adjusted under 35 U.S.C. 154(b) by 82 days.

(21) Appl. No.: 15/404,172

(22) Filed: Jan. 11, 2017

(65) Prior Publication Data

US 2018/0197338 A1    Jul. 12, 2018

(51) Int. Cl.
*G06F 3/01* (2006.01)
*G06F 3/0481* (2013.01)

(52) U.S. Cl.
CPC .......... *G06F 3/012* (2013.01); *G06F 3/04815* (2013.01)

(58) Field of Classification Search
None
See application file for complete search history.

(56) References Cited

U.S. PATENT DOCUMENTS

| 7,890,303 | B2 * | 2/2011 | Matsuda | G06F 17/50 700/95 |
| 9,472,161 | B1 * | 10/2016 | Ho | G09G 5/02 |
| 9,652,047 | B2 | 5/2017 | Mullins et al. | |
| 9,807,383 | B2 | 10/2017 | Crispin et al. | |
| 9,836,885 | B1 * | 12/2017 | Eraker | G06T 19/003 |
| 2005/0117215 | A1 * | 6/2005 | Lange | G02B 27/22 359/462 |
| 2008/0303832 | A1 * | 12/2008 | Kim | G09G 3/003 345/501 |
| 2012/0182403 | A1 * | 7/2012 | Lange | G02B 27/22 348/51 |
| 2012/0194506 | A1 * | 8/2012 | Passmore | G06T 15/00 345/419 |

(Continued)

FOREIGN PATENT DOCUMENTS

WO    2016138178 A1    9/2016

OTHER PUBLICATIONS

Mike Alger, Visual Design Methods for Virtual Reality,MA Moving Image, Sep. 2015, downloaded and printed Aug. 20 2019.

(Continued)

*Primary Examiner* — Hilina K Demeter
(74) *Attorney, Agent, or Firm* — Franklin & Associates International Inc; Matthew F. Lambrinos

(57) ABSTRACT

Interface-based modeling and design of three dimensional spaces using two dimensional representations are provided herein. An example method includes converting a three dimensional space into a two dimensional space using a map projection schema, where the two dimensional space is bounded by ergonomic limits of a human, and the two dimensional space is provided as an ergonomic user interface, receiving an anchor position within the ergonomic user interface that defines a placement of an asset relative to the three dimensional space when the two dimensional space is re-converted back to a three dimensional space, and re-converting the two dimensional space back into the three dimensional space for display along with the asset, within an optical display system.

19 Claims, 20 Drawing Sheets

(56) References Cited

U.S. PATENT DOCUMENTS

| | | | |
|---|---|---|---|
| 2012/0235988 A1* | 9/2012 | Karafin | H04N 13/261 345/419 |
| 2013/0083992 A1* | 4/2013 | Chia-Chen | G06T 7/593 382/154 |
| 2013/0235154 A1* | 9/2013 | Salton-Morgenstern | H04L 65/602 348/43 |
| 2014/0204088 A1* | 7/2014 | Kirk | H04N 19/597 345/427 |
| 2015/0369623 A1* | 12/2015 | Blumenberg | G01C 21/367 701/532 |
| 2016/0026253 A1* | 1/2016 | Bradski | G02B 27/225 345/8 |
| 2016/0335801 A1* | 11/2016 | Yoon | G06F 3/0481 |
| 2017/0364153 A1 | 12/2017 | Kazansky et al. | |
| 2018/0275762 A1 | 9/2018 | Freeman et al. | |

OTHER PUBLICATIONS

Mettle, Skybox Studio, download from the internet (https://www.mettle.com/category/skybox-studio/)on Aug. 20 2019.

* cited by examiner

INTERFACE-BASED MODELING AND DESIGN OF THREE DIMENSIONAL SPACES USING TWO DIMENSIONAL REPRESENTATIONS

CROSS REFERENCE TO RELATED APPLICATIONS

N/A

FIELD OF THE INVENTION

The present technology is directed to three dimensional modeling and design, and more specifically, but not by limitation, systems and methods that allow for the creation of three dimensional spaces displayed within optical display systems (such as a head mounted display) using two dimensional renderings of the three dimensional spaces where assets can be positioned within two dimensional renderings and converted into three dimensional spaces that include the assets.

SUMMARY

According to some embodiments, the present technology is directed to a method that may comprise: (a) converting a three dimensional space into a two dimensional space using a map projection schema, wherein the two dimensional space is bounded by ergonomic limits of a human, wherein the two dimensional space is provided as an ergonomic user interface; (b) receiving an anchor position within the ergonomic user interface that defines a placement of an asset relative to the three dimensional space when the two dimensional space is re-converted back to a three dimensional space; and (c) re-converting the two dimensional space back into the three dimensional space for display along with the asset, within an optical display system.

In some embodiments, the present disclosure is directed to a system of one or more computers which can be configured to perform particular operations or actions by virtue of having software, firmware, hardware, or a combination of these installed on the system that in operation causes or cause the system to perform the actions and/or method steps described herein. One or more computer programs can be configured to perform particular operations or actions by virtue of including instructions that, when executed by the data processing apparatus, cause the apparatus to perform the actions. One general aspect includes actions such as (a) converting a three dimensional space into a two dimensional space using a map projection schema, wherein the two dimensional space is bounded by ergonomic limits of a human; (b) receiving an anchor position within the ergonomic user interface that defines a placement of an asset relative to the three dimensional space when the two dimensional space is re-converted back to a three dimensional space; and (c) re-converting the two dimensional space back into the three dimensional space for display along with the two dimensional object, within an optical display system.

In another embodiment, the present disclosure is directed to a method that may comprise: (a) selecting coordinates for placement of an asset within a three dimensional rendering of a two dimensional space, wherein the two dimensional space is bounded by ergonomic limits of a human and a model of a three dimensional display generated by an optical display system; (b) generating the three dimensional rendering for display within the optical display system using the ergonomic limits and the model; and (c) displaying the asset in combination with a three dimensional rendering at the selected coordinates in such a way that the asset is displayed to the viewer using the optical display system in two dimensions while the three dimensional rendering is displayed to the viewer as a three dimensional image.

In another embodiment, the present disclosure is directed to a method that may comprise: (a) defining three dimensional positioning of virtual cameras that represent eyes of a viewer, and an inner-pupillary distance; (b) establishing a field of view for an optical display system; (c) selecting a map projection schema to convert a three dimensional space into a two dimensional space; (d) determining a stereo view frustum of the virtual cameras; (e) defining a desired distance for placement of elements in the three dimensional space; (f) establishing a two dimensional reference plane that intersects the stereo view frustum at the desired distance; (g) defining ergonomic limits of a human by: (i) rotating the virtual model in various directions using maximum comfortable head movements; and (ii) defining two dimensional labels in the three dimensional space that represent the head movements; and (h) generating an ergonomic user interface based on the ergonomic limits of the human using the map projection schema to create the two dimensional space.

The systems and methods disclosed herein can be embodied in a means for arrangement and/or steps for configurations in some embodiments. Additionally, the methods described herein can be embodied on a non-transitory computer readable medium that can be executed by a computing device.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1A:
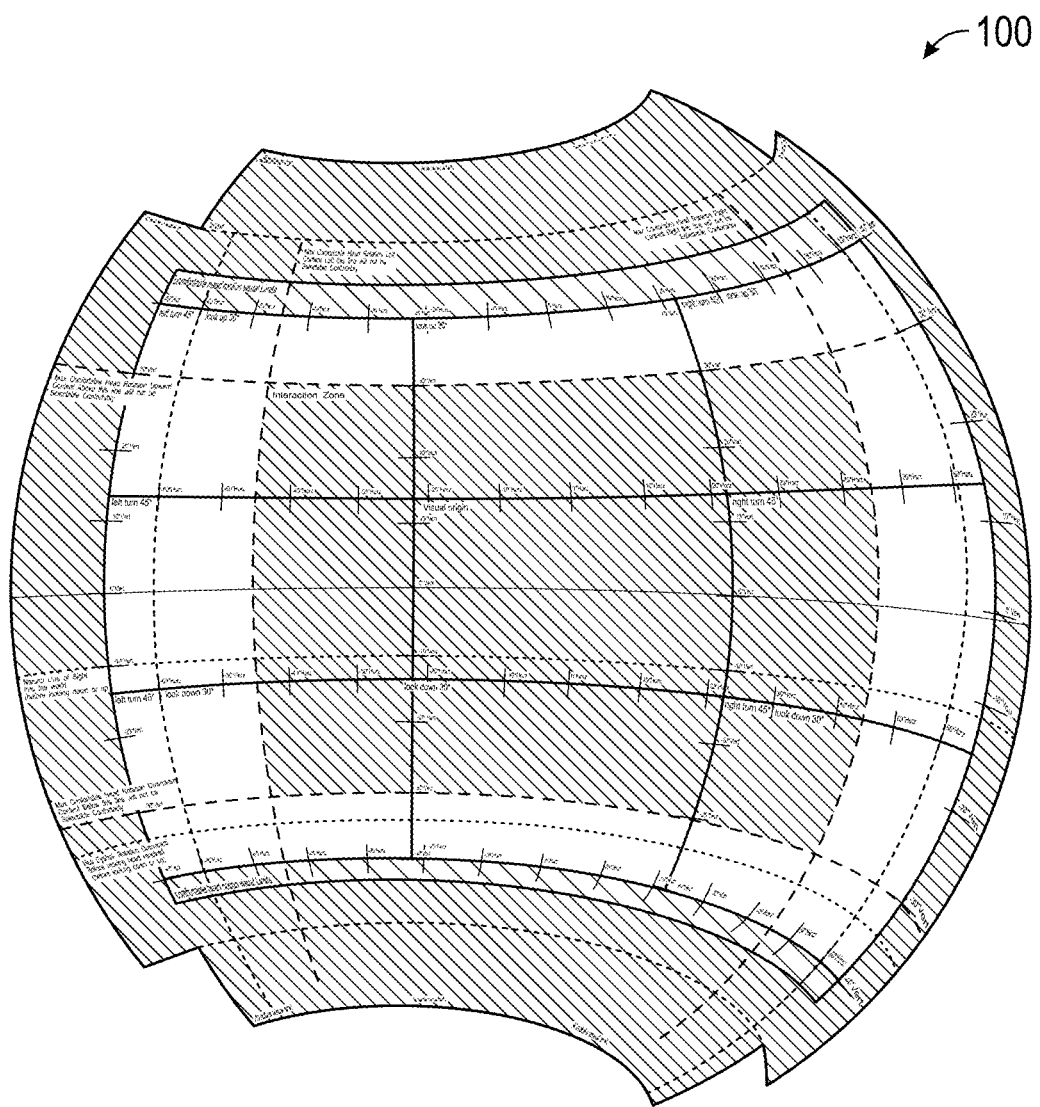
FIG. 1A illustrates an example three dimensional viewable space, which could include an image.

The present disclosure is generally related to three dimensional modeling of content for display on an optical display system such as a head mounted display (HMD), although other types of display system such as helmet mounted displays (e.g., virtual reality headsets) including both monocular and binocular helmet mounted displays, head-up displays (HUD), as well as other similar devices and systems that project and/or display two dimensional and three dimensional space and objects.

Generally, the methods and systems herein can be used to model a human head and eyes to determine human ergonomic limits. A three dimensional viewable space produced by the optical display system is also modeled. To be sure, the attributes of the three dimensional viewable space may vary according to the type of optical display system being modeled. Thus, while the human ergonomic limits for a single prototypical user may be uniform, the three dimensional viewable space generated by different optical display system are often different in shape and size. For example, some optical display systems use a semi-spherical three dimensional viewable space, while others project a nearly spherical three dimensional viewable space. Thus, modeling of the three dimensional viewable space allows for the accommodation of many types of optical display systems.

The methods and systems use the ergonomic limits and the modeling of the three dimensional viewable space to create an ergonomic graphical user interface (GUI) that can be displayed to a designer. The ergonomic GUI is a two dimensional space or representation of the modeling of the three dimensional viewable space, in some embodiments. For example, a map projection schema, such as equirectangular projection, is used to convert the three dimensional viewable space into a two dimensional representation (e.g., a two dimensional image). To be sure, the present technology is not limited to the use of equirectangular projection and any method for converting a three dimensional space into a two dimensional space that would be known to one of ordinary skill in the art with the present disclosure before them is likewise contemplated for use.

The ergonomic GUI is bounded by the human ergonomic limits mentioned above. For example, the ergonomic GUI includes the two dimensional rendering with indicia that reference the various viewing angles for the human. This information is advantageous for allowing designers to place assets in the three dimensional viewable space in the line of sight of the viewer (or in proximity thereof) for optimal viewing.

The ergonomic GUI can be used by a designer to quickly and efficiently augment the three dimensional viewable space by placement/anchoring of assets into its two dimensional representation in the ergonomic GUI. The systems and methods allow for toggling between the two dimensional space and the three dimensional space to visually verify optimal placement of assets within the three dimensional viewable space.

For context, the present technology solves a problem for a developer or designer of augmented reality and/or virtual reality content. Namely, the developer desires a way of organizing three dimensional and/or two dimensional content around a viewer, which may involve placing content (e.g., assets) around the viewer in several places in a three dimensional viewable space. Yet designing much of this three dimensional viewable space (3D GUI) happens in software using two dimensional representations, and as a developer it is often unclear where exactly along a sphere a two dimensional or three dimensional asset should exist. Ergonomic factors or limits of a human being's ability to see the content are also a consideration.

The present technology provides a solution, which comprises representing a three dimensional viewable space in a two dimensional manner, where the two dimensional space is optimized for designing and spatially placing assets that also addresses the ergonomic limits of head rotation and natural lines of sight. This two dimensional space/representation could be used to both design the size and look of assets, and represent their locations around the user. The two dimensional representation could be automatically re-projected into the three dimensional viewable space (e.g., toggled), eliminating or reducing the lengthy and complex process of positioning these assets in the three dimensional viewable space manually.

In some embodiments, the designer can employ masking or display a visual-acuity-heat-map within the ergonomic GUI to further improve optimal placement of assets for eventual display when the three dimensional viewable space is rendered on a head mounted display.

These and other advantages of the present disclosure are described in greater detail throughout with reference to the collective drawings (FIGS. 1A-21).

Figure 1B:
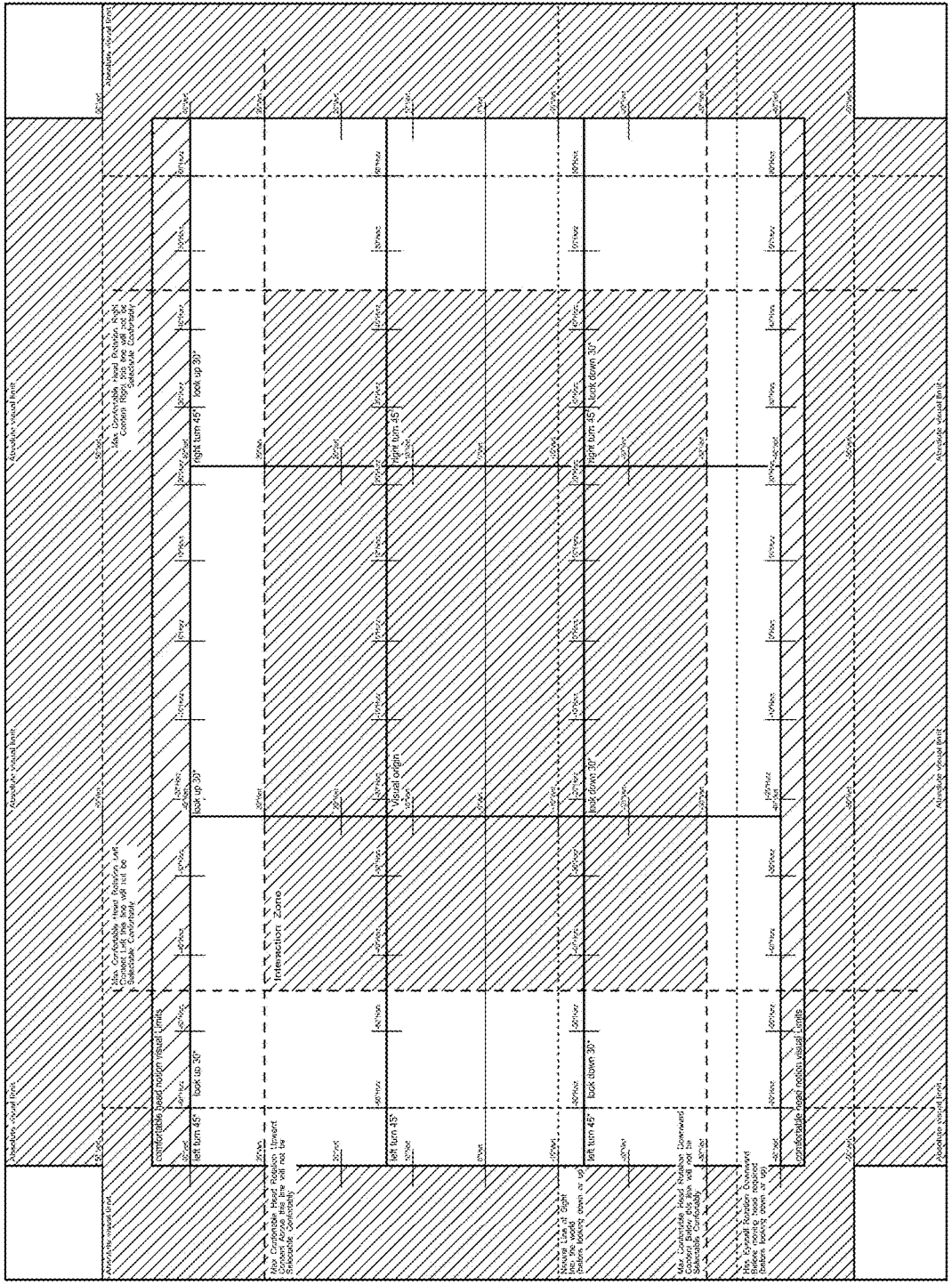
FIG. 1B illustrates a two dimensional representation of the three dimensional viewable space of FIG. 1A with indicia that represents human ergonomic viewing limits.

Referring now to FIGS. 1A and 1B collectively, a three dimensional viewable space 100 is illustrated. The three dimensional viewable space 100, in this embodiment, comprises a semi-spherical shaped space that is generated by an example optical display system. Again, the optical display system can include any augmented reality or virtual reality producing device. The three dimensional viewable space 100 can comprise an image that is converted into three dimensional viewing by any method or process that would be known to one of ordinary skill in the art with the present disclosure before them. While a spherical shape is contemplated, any number of shapes such as cubic, cylindrical, or other polygonal three dimensional shapes can also be utilized.

The three dimensional viewable space 100 is then converted into a two dimensional space/representation 102 through use of a map projection schema. In one embodiment, the map projection schema comprises equirectangular projection. Other map projection schemas include but are not limited to Cassini, Mercator, Cubemap, Web Mercator, Gauss-Kruger, and Gall stereographic—just to name a few.

In some embodiments, the two dimensional space 102 is a two dimensional rendering of the three dimensional viewable space 100 with indicia displayed thereon. The indicia demarcate human ergonomic limits and include any of limits of human eye movement from side-to-side, up-to-down, and eye rotation, as well as head movement from side-to-side and up-to-down. These human ergonomic limits refer to the maximum limits of these physical movements so as to avoid pain and/or injury. While the systems and methods herein can utilize basic human ergonomic limits as a basis for determining the indicia placed on the two dimensional space 102, the human ergonomic limits can be determined on an individual basis. Thus, individuals with limited range of motion can be accommodated such that three dimensional viewable spaces are created that are optimal for the individual.

Thus, prior to displaying a three dimensional viewable space to a viewer, a virtual model is created for a viewer's head, eyes, and in some embodiments a particular optical display system.

Figure 2A:
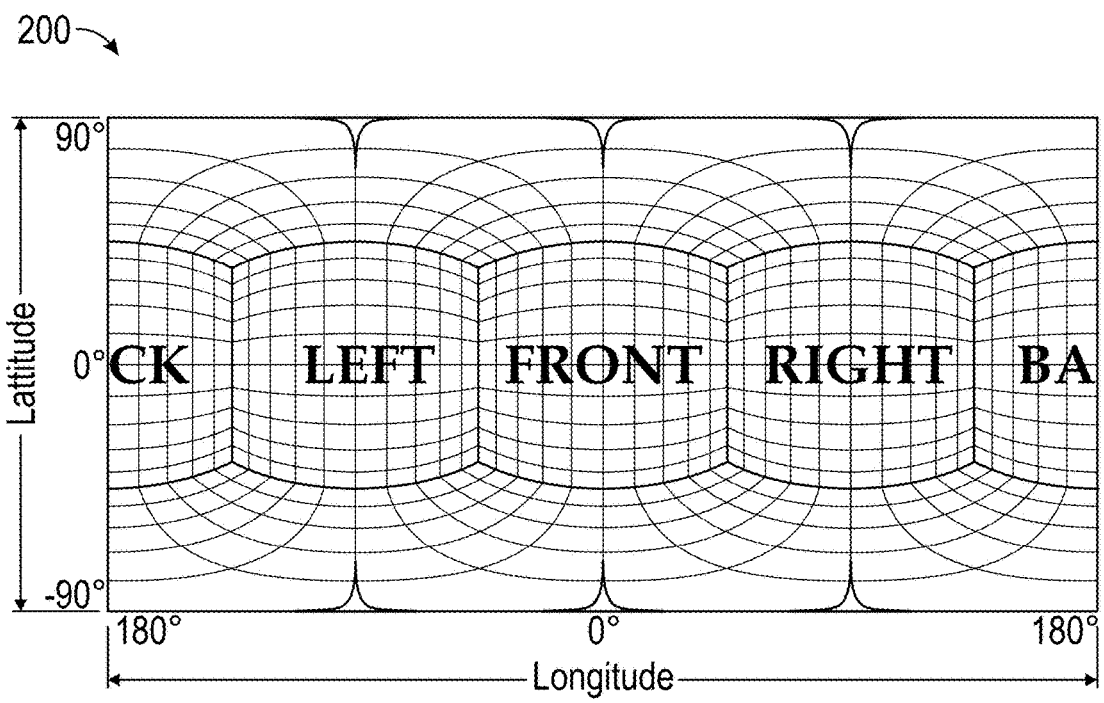
FIG. 2A illustrates an example map projection schema that can be used to convert the three dimensional viewable space into a two dimensional space.
Figure 2B:
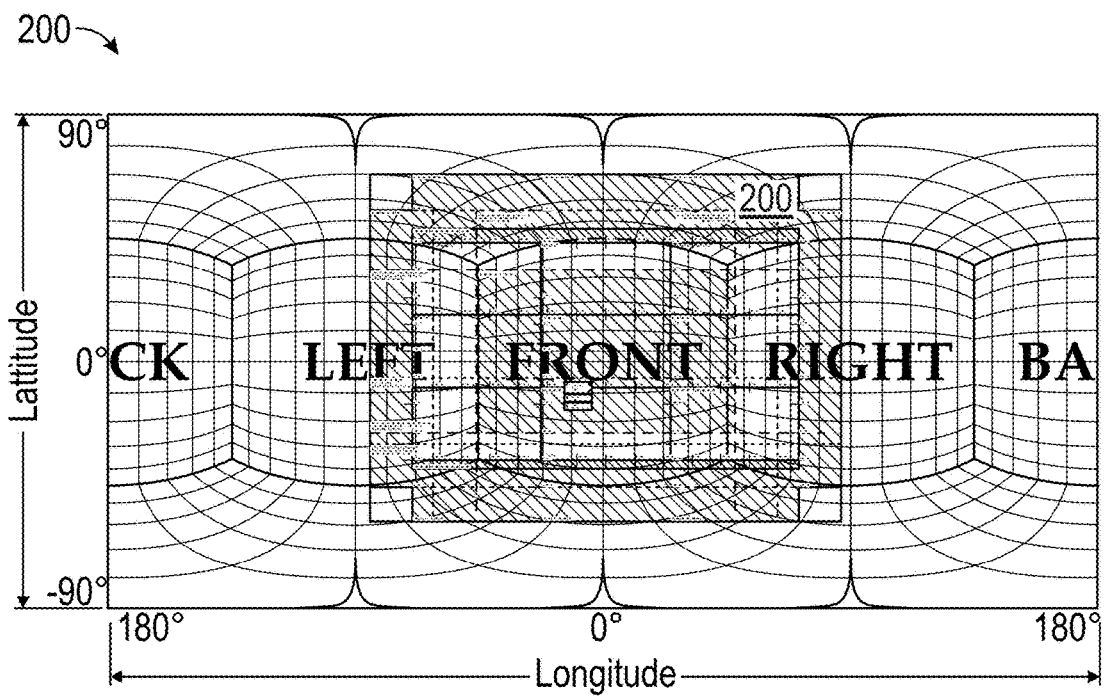
FIG. 2B illustrates the application of the example map projection schema to convert the three dimensional viewable space into a two dimensional space.

FIG. 2A illustrates an example equirectangular projection mapping schema 200. FIG. 2B illustrates the equirectangular projection mapping schema 200 as applied to the converted two dimensional space version 102 of the three dimensional space of FIG. 1A.

In one embodiment, a server is configured to provide the modeling, rendering, and provision of ergonomic GUIs for a developer. An example computing system is described with reference to FIG. 21. The server in this instance comprises a specific-purpose computing device that is programed to perform various operations that are not well-known, ordinary, well-understood, or generic computing functions.

Figure 3:
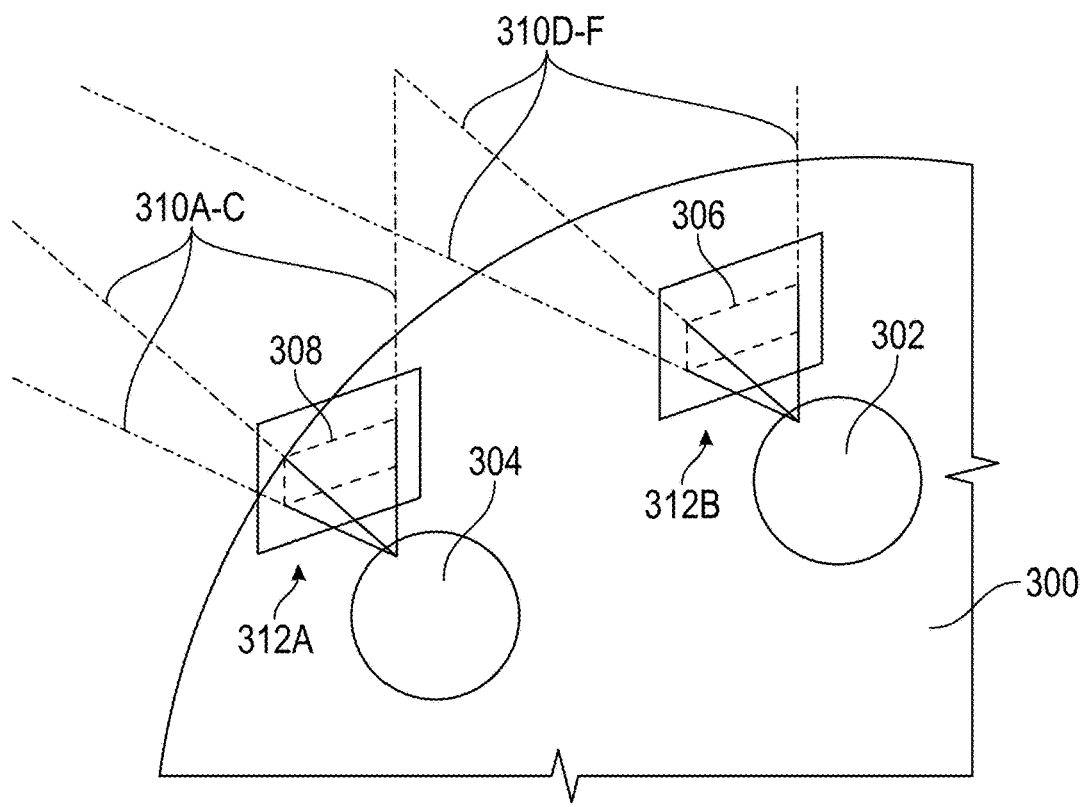
FIG. 3 is a schematic diagram that illustrates modeling of virtual cameras that represent eyes of a viewer, and an inner-pupillary distance, where the lines are indicative of view frustums of the virtual cameras.

Referring now to FIG. 3, in one or more embodiments, the server is configured to create a virtual model of a user's head, eyes, and an optical display of an optical display system. Some embodiments include determining three dimensional positions of virtual cameras that represent the human's eyes, their inner-pupillary distance, and any other parameter as required by the specific optical display system for which the renderings are designed for display.

A human head 300 is represented, which comprises two eyes 302 and 304. A position and placement of virtual cameras 306 and 308 are determined for the two eyes 302 and 304, respectively. Lines 310A-F represent view frustums of each OpenGl cameras (e.g., virtual human eyes), any three dimensional object in these pyramid shapes are drawn to the displays. A near clipping plane is aligned with the active area of the optical display system (for example a Lumus™ display). Lines 312A and 3128 are near-frustum. Objects within in this area are not drawn to the displays in some embodiments.

Figure 4:
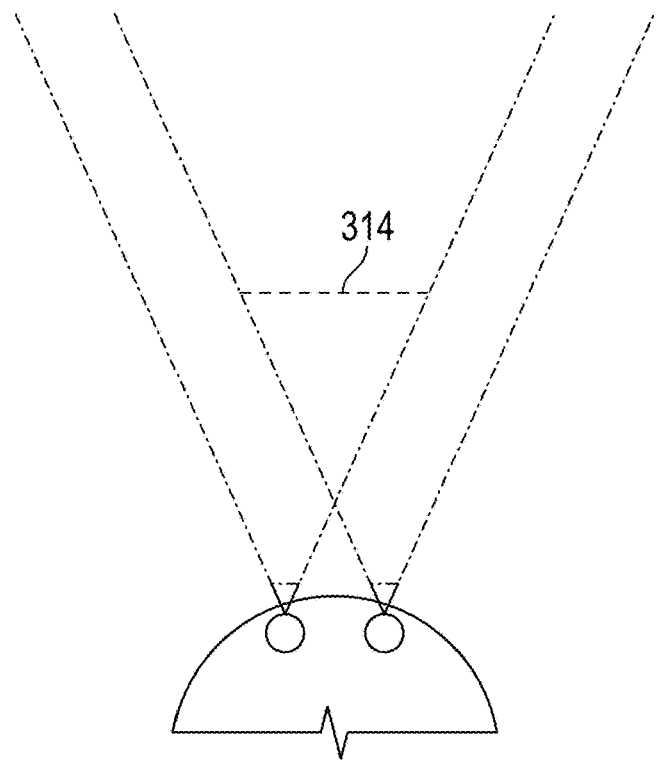
FIG. 4 is a schematic diagram that illustrates a reference plane or line used to delineate a "comfort distance" from the virtual cameras (e.g., modeled eyes).

In FIG. 4, line 314 represents a "comfort distance" relative to a viewer's face. In one embodiment, the comfort distance equals six inches, although other distances can be used depending on the preferences of the viewer. Content placed any closer than the comfort distance would be uncomfortable to view, but again this distance is variable.

The generation of view frustums and imposition of a comfort distance plane is generally referred to as the determination of a field of view for the optical display system and the resulting OpenGL projection matrix used to draw virtual elements to the screen or display of the optical display system.

Figure 5:
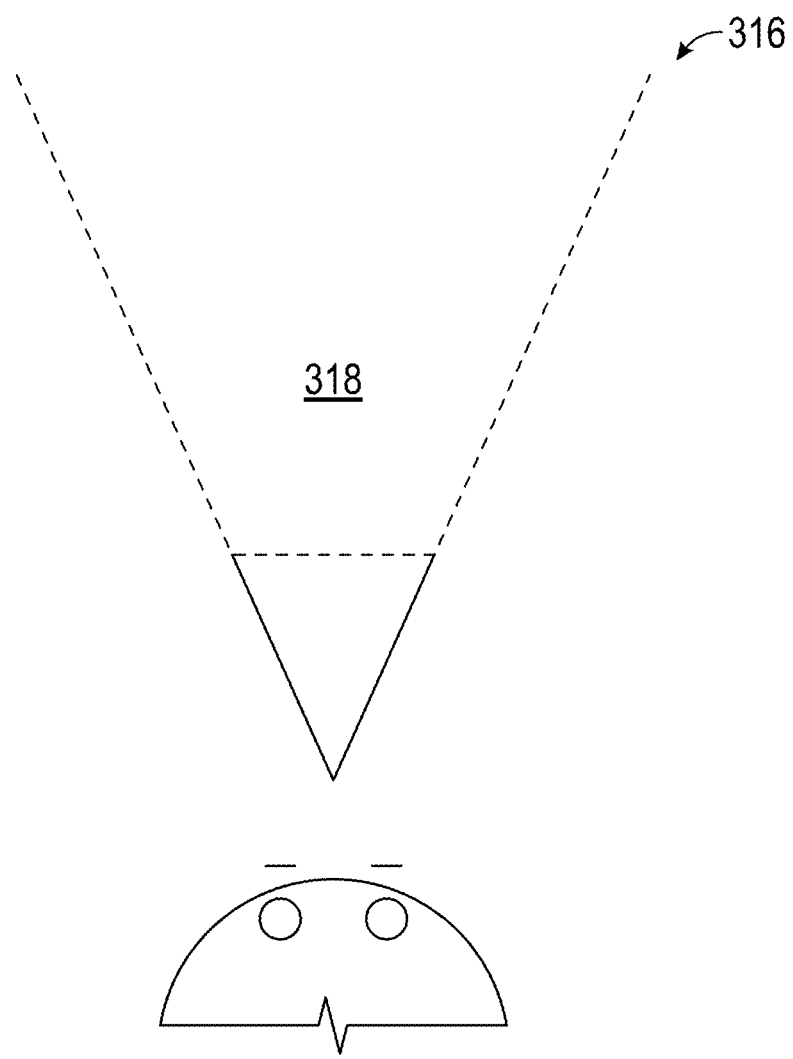
FIG. 5 is a schematic diagram that illustrates an example stereo view frustum created from the modeling of the virtual cameras.

Next, the server performs operations comprising determining a "stereo view frustum" (the three dimensional space in which virtual content would be seen by both eyes) which is the additive shape of the left eye and right eye view frustum. This stereo view frustum 316 is illustrated in FIG. 5. To be sure, the present disclosure can be adapted for use with mono view frustum technology as well as stereo views.

FIG. 5 illustrates an example stereo view frustum 316 which represents a three dimensional space in which virtual content would be seen by both eyes, which comprises an additive shape of the left eye view frustum and the right eye view frustum. Virtual content within area 318 is viewable by both virtual cameras and is thus drawn on both virtual displays, and viewable in stereo three dimensions by human eyes.

The server then allows for specification of a desired distance that virtual elements should exist from a viewer, which is dependent on a focal length of the optical display system. For multiple distances, the following steps can be repeated for each distance (processes associated with the descriptions of FIGS. 6 and 7).

Figure 6:
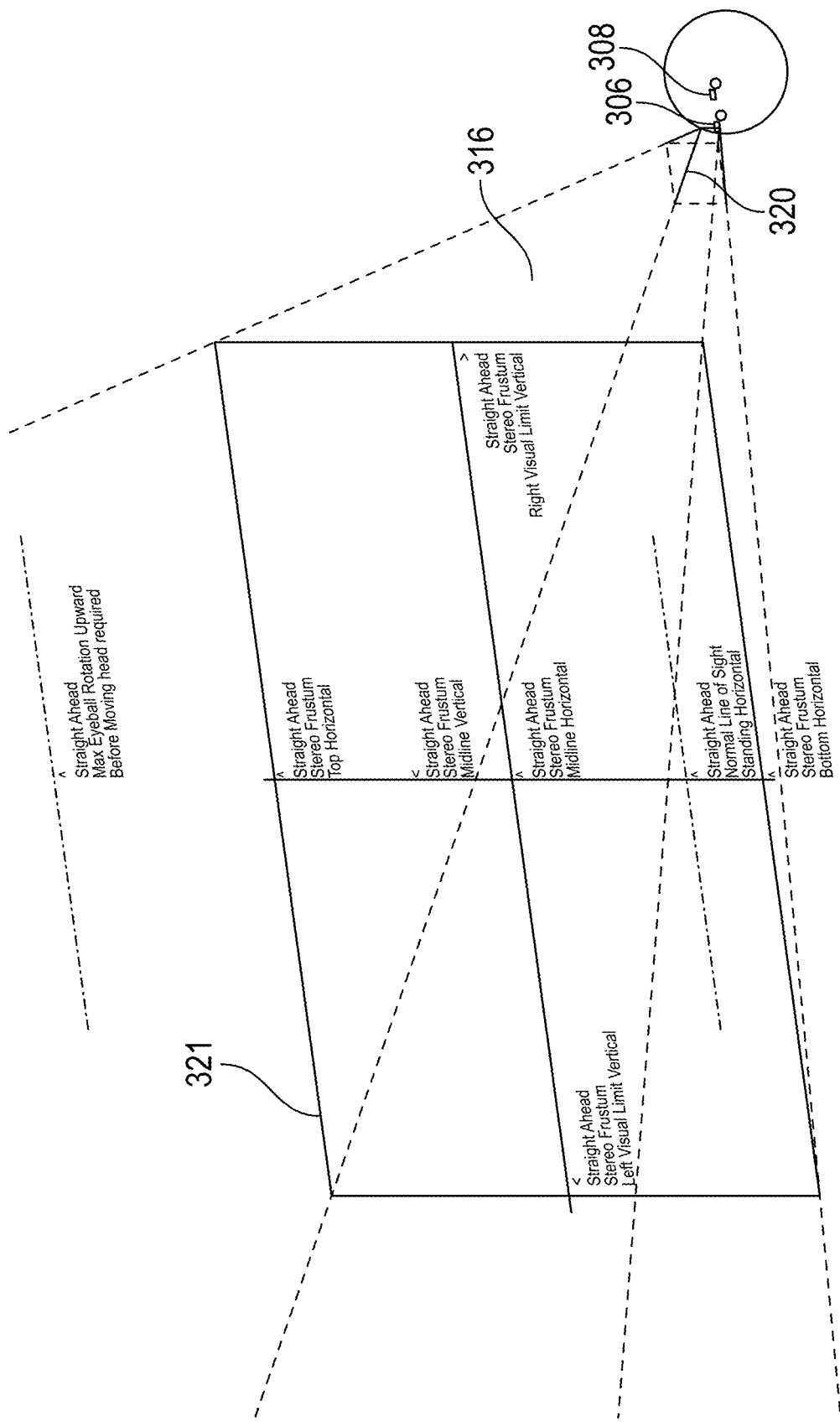
FIG. 6 is a schematic diagram that illustrates a reference plane set at a desired distance.

As illustrated in FIG. 6, in some embodiments, the server draws a two dimensional plane 320 (illustrated in an expanded view as a projection 321) in three dimensional space, intersecting the stereo view frustum 316 at a desired distance from the virtual cameras 306 and 308. This two dimensional plane 321 represents a single field of view of the viewer. The two dimensional plane 320, placed at two meters from a Lumus™ display (an example optical display system) was rendered and labels were added that describe ergonomic information. By way of non-limiting example, ergonomic information was obtained from "The Measurement of Man" by Henry Dreyfuss and combined with limits of the modeled displays.

Figure 7:
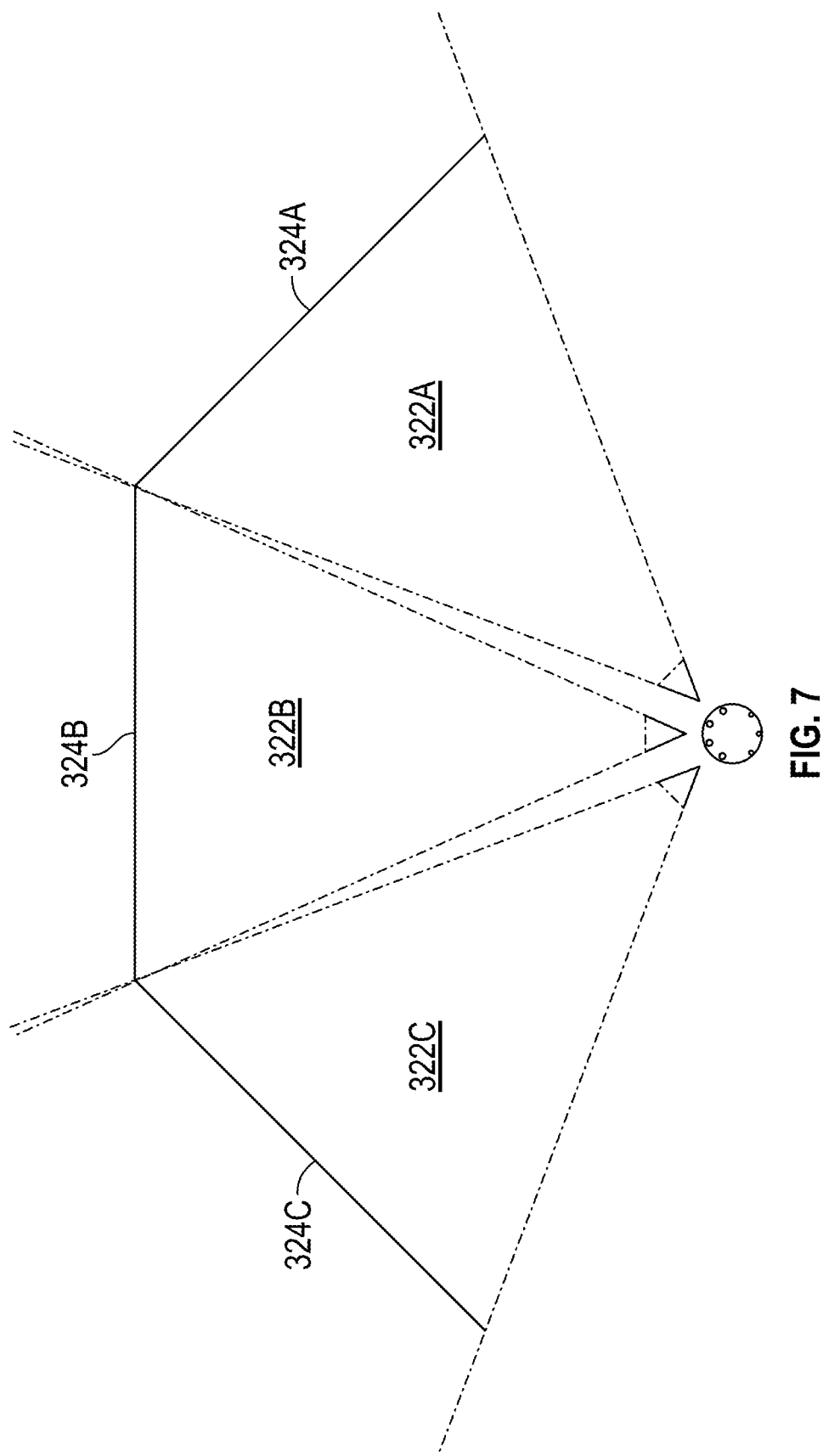
FIG. 7 is a schematic diagram that illustrates views taken at multiple head positions using ergonomic limits of human head and/or eye movement.

The server can then duplicate the entire model repeating the above-mentioned steps for multiple head rotations. For example, the virtual model of the head is then rotated to either side by a maximum comfortable head rotation according to ergonomic limits of average humans, or even for specific users. FIG. 7 illustrates a plurality of positions taken at 45 degree intervals (e.g., a maximum comfortable head rotation according to Dreyfuss). The distance that content should appear from the user is represented by lines 324A-C, in some embodiments this is the focal length of the head mounted display.

The server can then rotate the virtual head(s) several more times to represent comfortable head rotation ranges and maximum head rotations. The limits are labeled by the server in three dimensional space and this information is projected into a two dimensional representation using an equirectangular projection matrix, as illustrated in FIGS. 2A and 2B.

The processes above can also be used to generate two dimensional labels, which are referred to as indicia, in the three dimensional space for establishing a vertical midline as a maximum comfortable head rotation leftward.

The above process can also be repeated as many times as desired to cover the total ergonomic limits of average viewers, or a specific user.

To account for and remedy distortion artifacts, the server can re-trace elements of the two dimensional equirectangular projection. For example taking the stereo view frustum and redrawing an upper-left point of the plane to an upper right point, effectively removing a distorted line and replacing it with a straight line.

The two dimensional representation with indicia is referred to as an ergonomic GUI.

In one embodiment, the server can specify anchor points that determine the placement of an asset added by the developer. In some embodiment the server can use a midpoint position of the asset as a representation of where, in three dimensional space, the asset should be located around the viewer (at the defined depth determined infra). In some embodiments, the server does not render everything designed and literally project the images and assets in three dimensions, as doing so would create a lot of undesired distortion artifacts. The server can overlay the asset, whether it is two dimensional, two and a half dimensional, or three dimensional, at the anchor point, while projecting the three dimensional space in three dimensions without distortion. Thus, in some embodiments, a two dimensional asset will appear to the viewer in two dimensions within the display while the remainder of the display is viewable in three dimensions.

Figure 8:
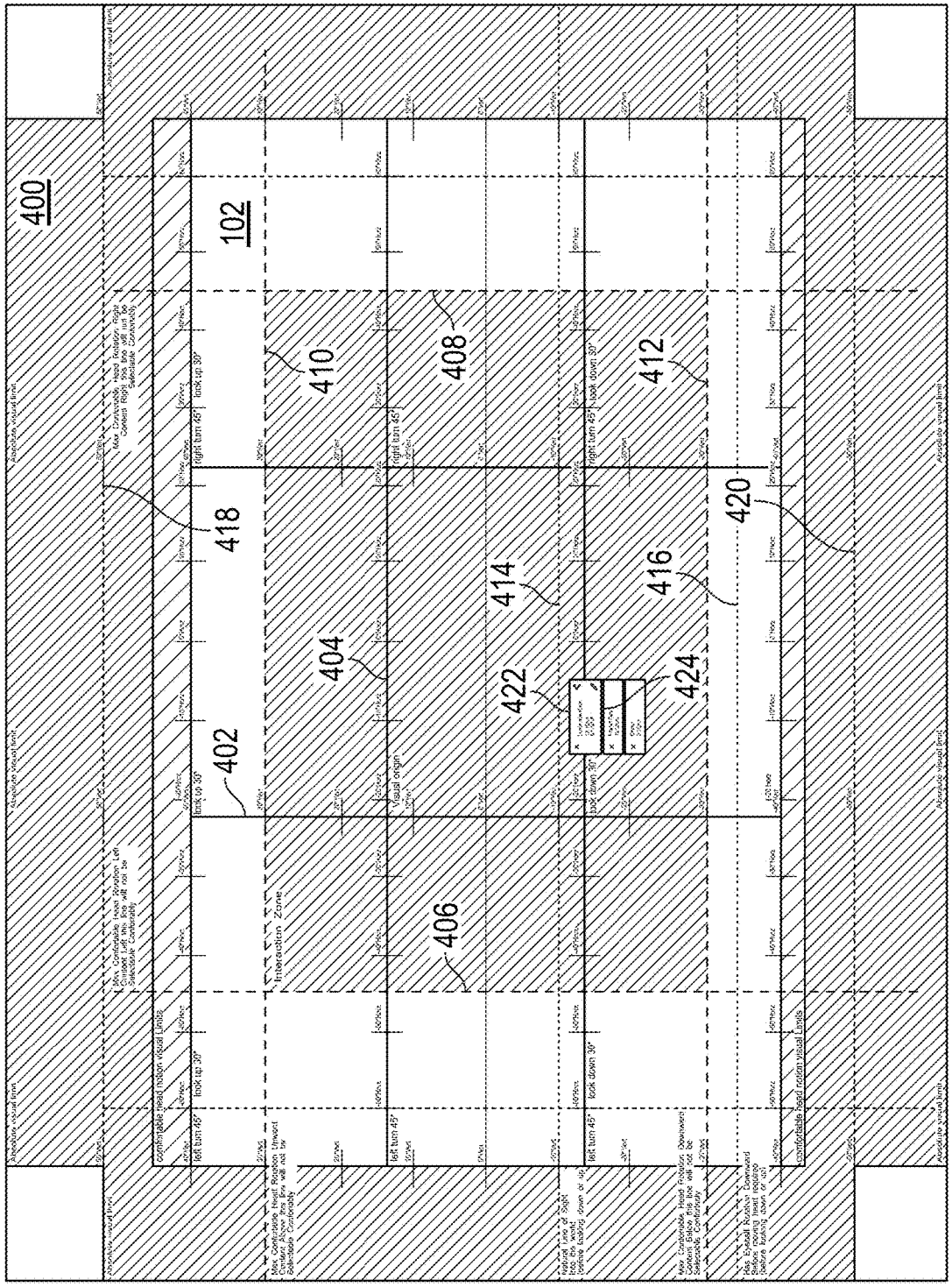
FIG. 8 illustrates an equirectangular ergonomics GUI with an asset of a GUI element associated therewith.

FIG. 8 illustrates an example two dimensional space/representation that comprises, for example, the two dimensional space 102 of FIG. 1B which has been augmented with indicia to create an ergonomic GUI 400.

In general, the ergonomic GUI 400 is a design and engineering suite that describes a three dimensional space around a user at a specified distance (usually the focal length of the HMD) in the form of a two dimensional document (e.g., two dimensional space/representation) convenient for designing. The ergonomic GUI 400 is useful for describing where applications and UI content should exist around a viewer in three dimensional spaces.

The ergonomic GUI 400 is a representation of a portion of a spherical space (or other similar three dimensional shape) in some embodiments. For example, the ergonomic GUI 400 illustrates approximately 120 degrees of a total three dimensional space that has been mapped from three dimensions to two dimensions using an equirectangular projection.

The ergonomic GUI 400 also incorporates indicia that represent ergonomic limits of head rotation and natural lines of sight, in some embodiments. The ergonomic GUI 400 is useful for planning out where applications exist around a user and predicting which areas are uncomfortable to view. For example, the indicia can represent maximum comfortable head rotation angles. The region within those lines are referred to as an interaction zone, which is a viewing space where a viewer can comfortably view and/or dwell on assets a given area.

The indicia can include ergonomic limits determined during the modeling process described infra. For example, the indicia comprises matrix lines that create a grid that divide the two dimensional space 102 into segments. The longitudinal lines, such as line 402 represent head rotation angles along the yaw axis (e.g., left-to-right). Latitudinal lines, such as line 404 represent head rotation angles along the pitch axis (e.g., up and down). Longitudinal lines 406 and 408 illustrate left and right maximum head rotation limits, respectively. Latitudinal lines 410 and 412 illustrate up and down maximum head pivot limits, respectively. To be sure, while these ergonomic limits reference head rotation and pivot, the ergonomic limits can equally be used to represent eye movement limitations only and/or combinations of both head rotation and pivot limits and eye movement limits. Additionally, eye rotations can also be considered and mapped as part of the indicia.

For example, line 414 represents a line of sight of the viewer and line 416 represents a maximum downward eyeball rotation that can be performed by a viewer before having to pivot their head downward to see something. Thus, if the developer desires to place an asset for optimal viewing by a viewer so as not to require the user to have to pivot their head downwardly, the developer can place the asset at least above line 416. In one embodiment, a developer places an asset 422, which includes a GUI menu above the maximum downward eyeball rotation line 416, near the center of the viewer's line of sight.

In some embodiments, the ergonomic GUI 400 comprises absolute visual limits that can also be illustrated using lines 418 and 420.

Figure 9:
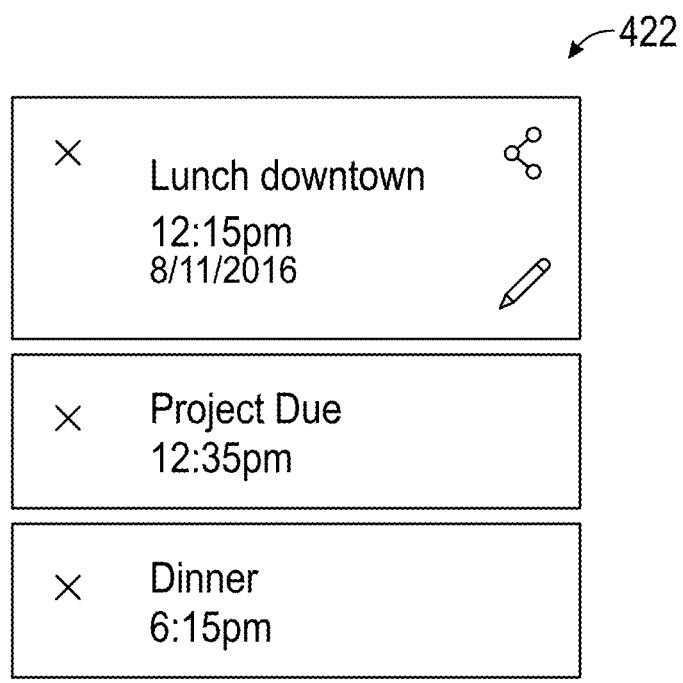
FIG. 9 is a screenshot of the asset in FIG. 8.

A perspective view of the asset 422 is illustrated in FIG. 9 for clarity.

After the developer has placed the asset 422 into the ergonomic GUI 400, the server determines a midpoint of the asset 422 and creates an anchor point 424 that is aligned with the midpoint of the asset 422. The server stores the position of the anchor point 424 prior to converting the ergonomic GUI 400 and the two dimensional space 102 back into a three dimensional space/rendering.

This anchor point 424 allows the server to re-render the three dimensional space and then place the asset 422 into the three dimensional space at the anchor point 424. Thus, in some embodiments, the asset 422 is placed into or overlaid onto the three dimensional space such that the asset 422 is not directly projected into the three dimensional space which would potentially lead to distortion of the asset 422 when rendered. The asset 422 can float in two or three dimensional space.

Figure 10:
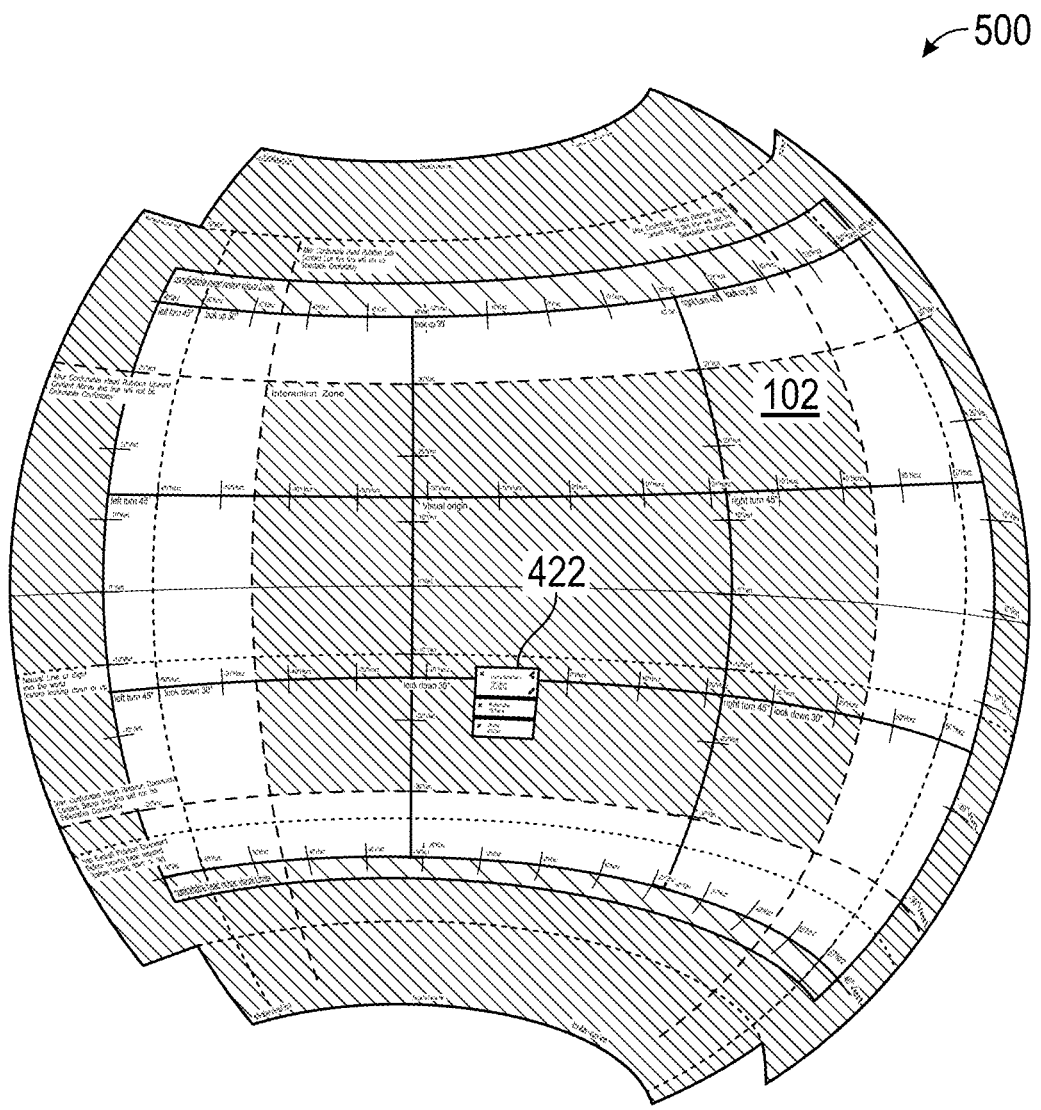
FIG. 10 is a perspective view of a three dimensional display generated from the ergonomic GUI with the asset.

FIG. 10 illustrates the three dimensional space 500, which is a re-rendered version of the two dimensional space 102 (also see FIG. 1B or FIG. 8) that was augmented with the asset 422. Indeed, the three dimensional space 500 comprises the two dimensional space rendered back into the three dimensional space 102 of FIG. 1A, with the addition of the asset 422.

The three dimensional space 500 is a spherical version of the ergonomic GUI 400 of FIGS. 8 and 9, for illustrative purposes so as to clarify that the placement of the asset 422 is in accordance with its placement in the ergonomic GUI 400.

Figure 11:
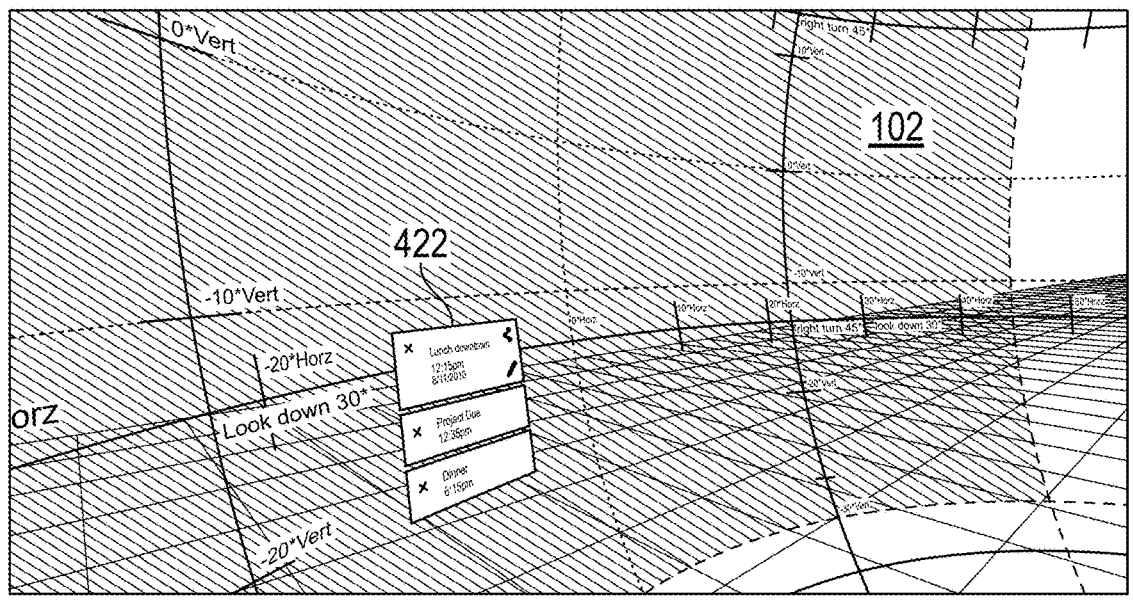
FIG. 11 is a close-up view illustrating the GUI element placed in three dimensions at the same location illustrated in the ergonomics GUI.

FIG. 11 is a close up view of FIG. 10 and illustrates the asset 422 as being placed into the three dimensional space 500 as an overlay, such that the asset 422 does not take the shape of the three dimensional space 500, which in this instance is a curvature. The asset 422 appears as a two dimensional flat GUI menu that appears to float over the three dimensional space 500.

Figure 12:
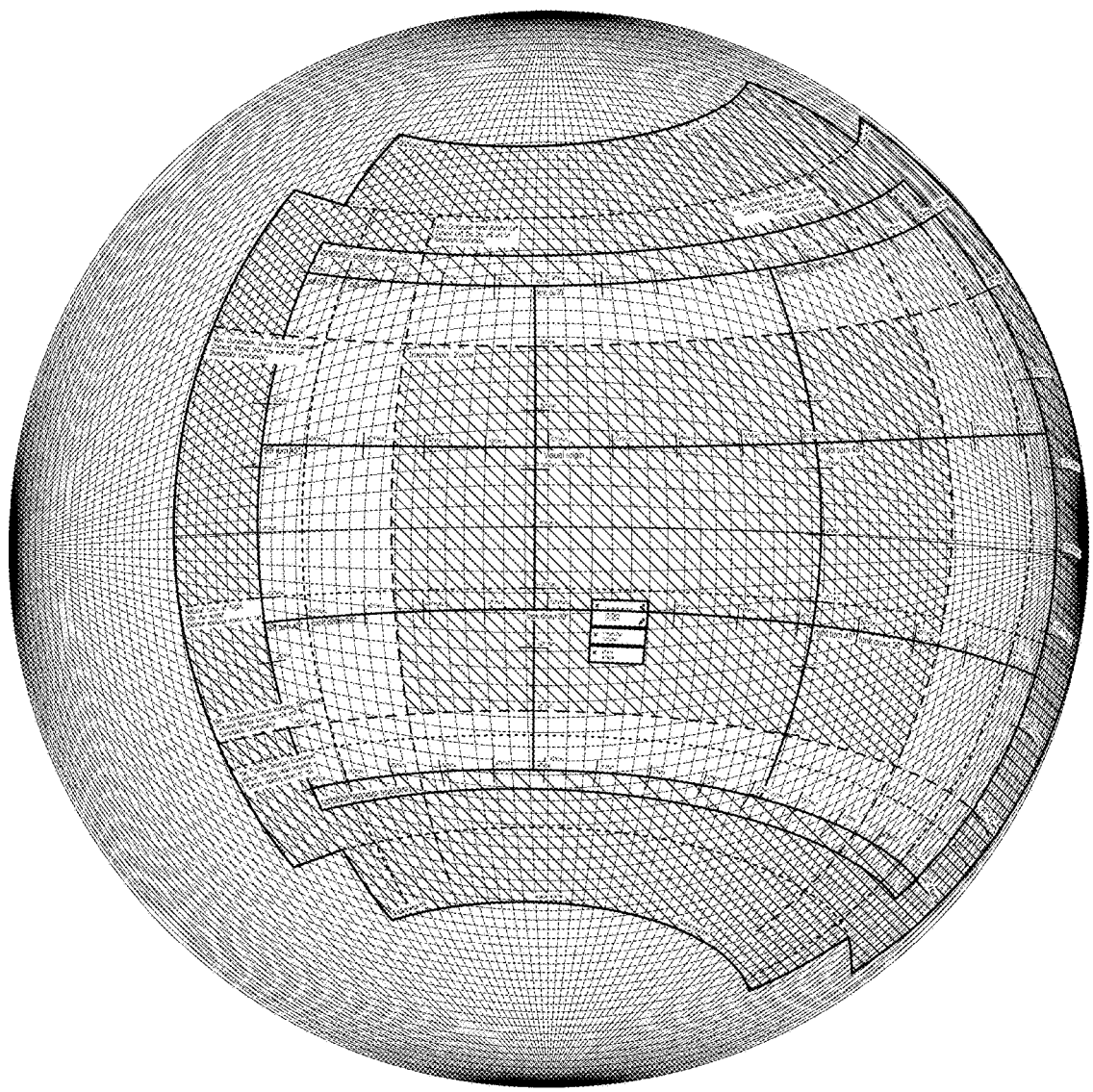
FIG. 12 is yet another view similar to FIG. 10 with the total spherical space beyond the ergonomic limits illustrated.

FIG. 12 is a further expanded view of FIG. 10.

According to some embodiments, the present disclosure provides various tools that allow a designer or developer to strategically place assets within an ergonomic GUI. Example tools mimic a field of view of an example viewer or model the field of view using a heat map.

Figure 13:
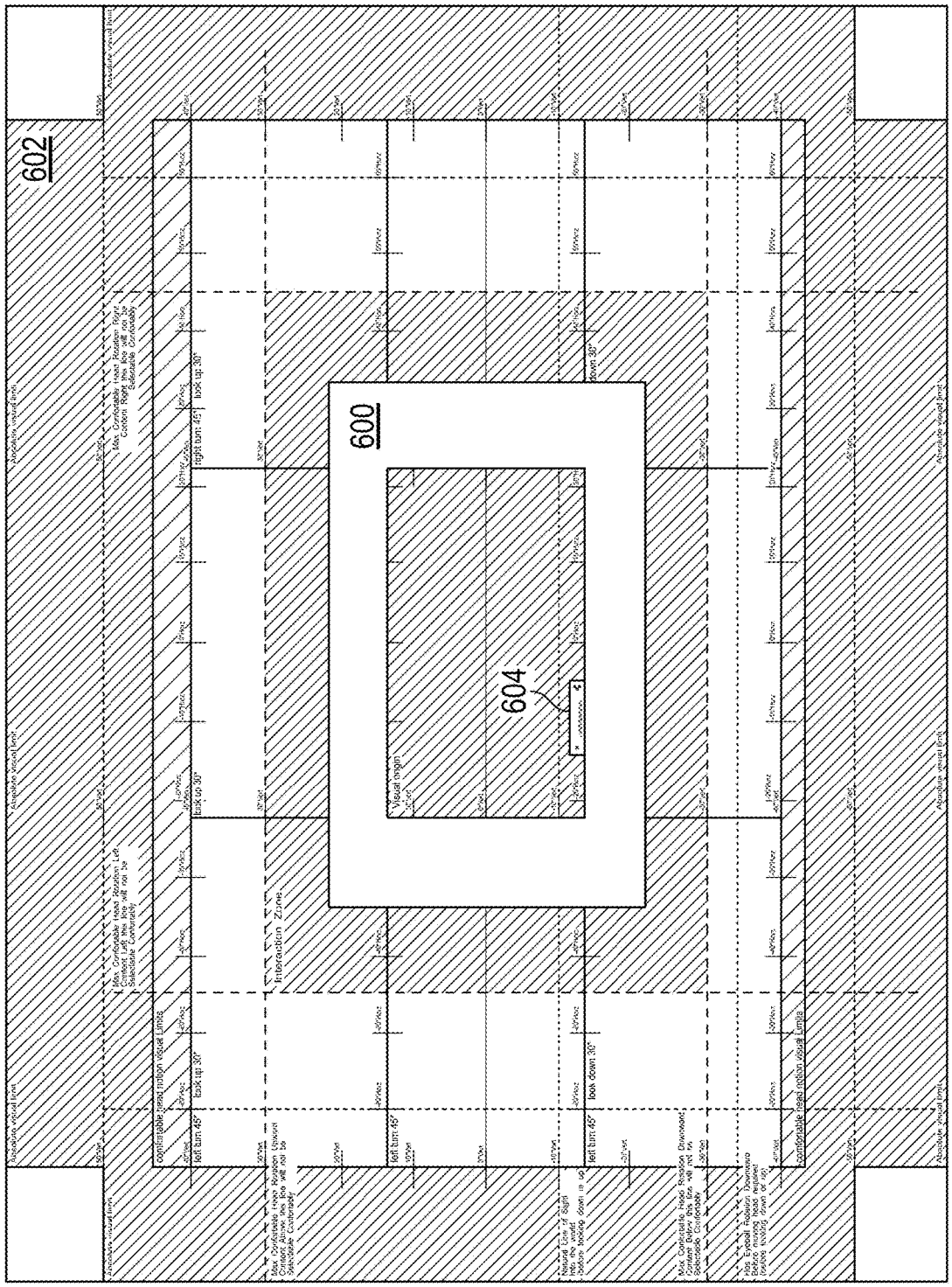
FIG. 13 is an alternative embodiment of an equirectangular ergonomics GUI with an additional mask that can be overlaid which mocks up a user's field of view.
Figure 14:
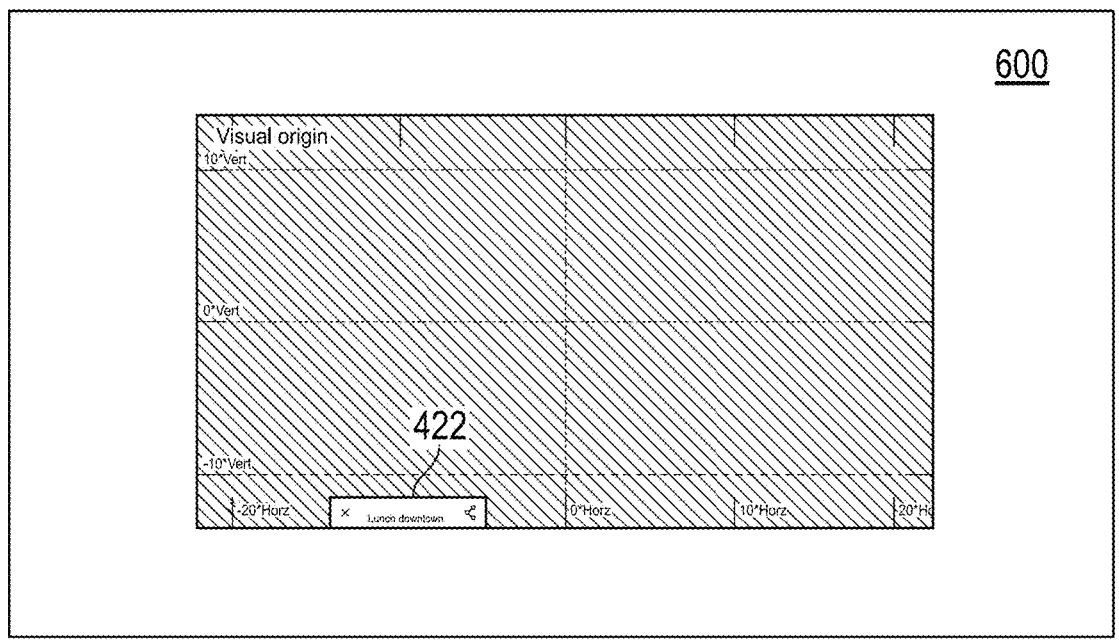
FIG. 14 is a close of up view of the masked portion of the equirectangular ergonomics GUI of FIG. 13.

FIGS. 13 and 14 collectively illustrate an example FOV (field of view) mask 600 that is applied to an example ergonomic GUI 602. The example FOV mask 600 can be overlaid on the ergonomic GUI 602 and mocks up a viewer's FOV. That is, a space within the masked area is what a viewer could see at once without moving their eyes or head.

Only a portion of an asset 604 is visible within the space of the FOV mask 600. Thus, if the developer desires for the asset 604 to be visible without requiring the viewer to move their head or eyes, the developer can move the asset higher into the area defined by the FOV mask 600.

Figure 15:
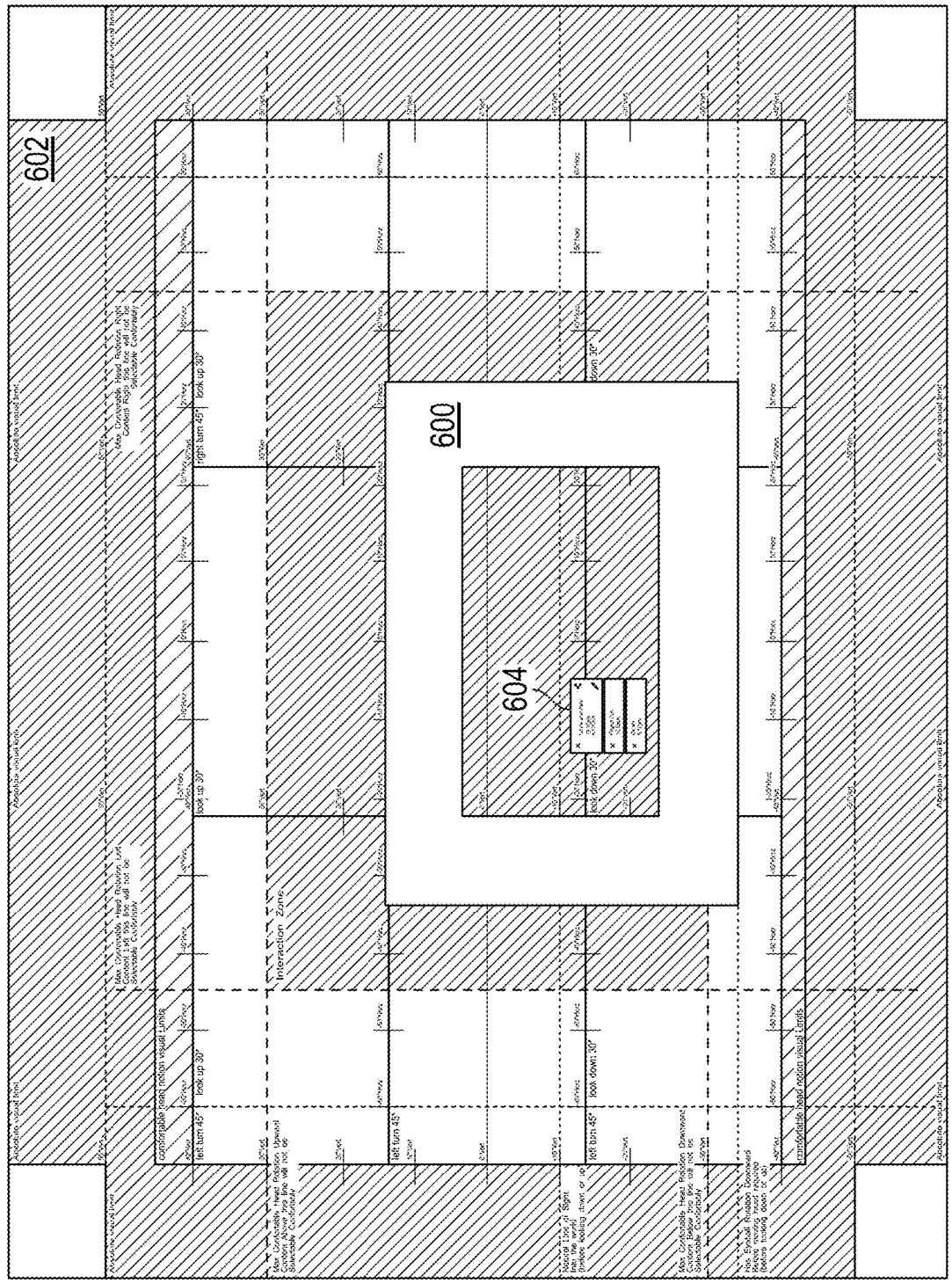
FIG. 15 is another view of the equirectangular ergonomics GUI of FIG. 13 where the mask has been moved downward relative to FIG. 13.
Figure 16:
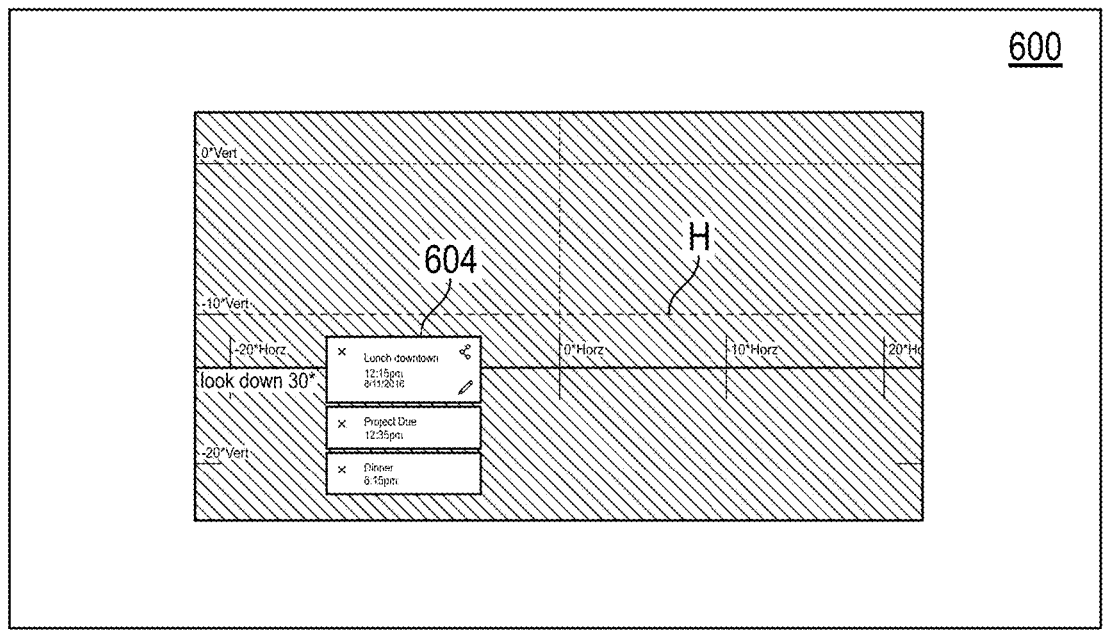
FIG. 16 is a close of up view of the masked portion of the equirectangular ergonomics GUI of FIG. 15.

FIGS. 15 and 16 collectively illustrate movement of the FOV mask 600 downwardly. The horizontal midline H is now at −10 degrees vertical, which means the viewer would have to rotate their head 10 degrees toward the floor in order to see the space within the FOV mask 600 and view the whole GUI element. This FOV modeling is useful because it means that before any code is written in the development process, a GUI designer can simulate a viewer's interaction with display generated by an optical display system.

Figure 17A:
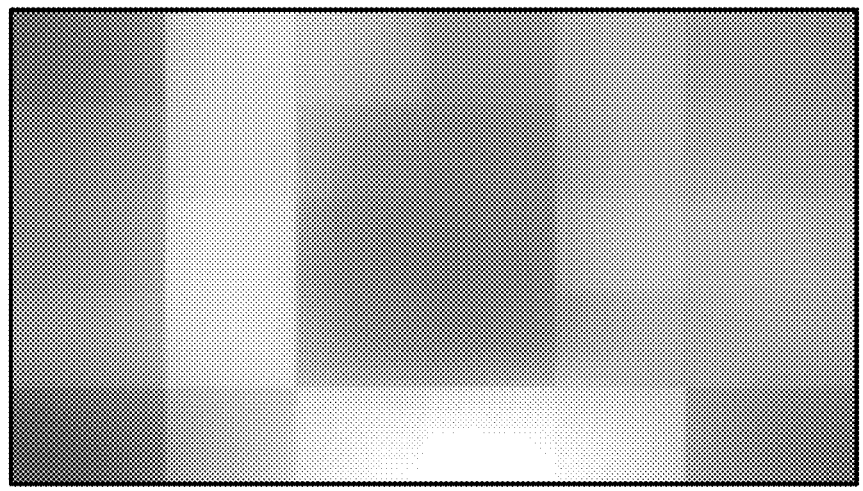
FIGS. 17A and 17B collectively illustrate a visual acuity heat map and its application to an ergonomics GUI.
Figure 17B:
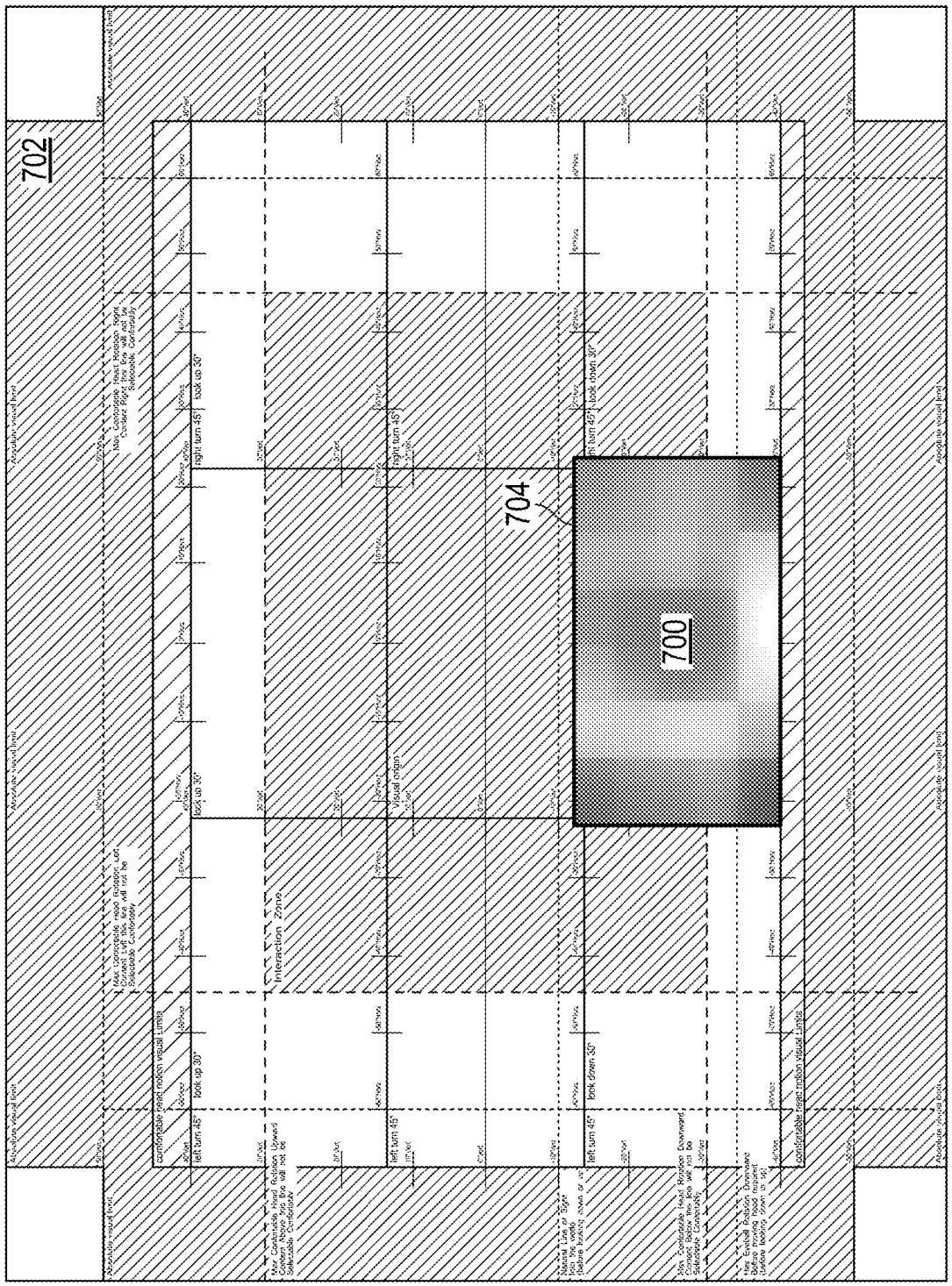

FIGS. 17A and 17B collectively illustrate a visual acuity heat-map 700. The visual acuity heat-map 700 comprises a pixelated or block-colored representation of a viewer's acuity within a specified field of view. Cooler hues near the middle and upper middle of the visual acuity heat-map 700 indicate higher acuity than areas around the periphery of the visual acuity heat-map 700 and towards the lower edge.

The visual acuity heat-map 700 can be applied to an example ergonomic GUI 702. In some embodiments, the latitudinal and longitudinal lines that represent the ergonomic limits of the viewer form segments, such as segment 704. Each segment comprises a portion of a three dimensional representation that will be viewable by the viewer at one time without moving their head and/or eyes. The visual acuity heat-map 700, when applied to a segment of the ergonomic GUI 702, indicates optimal viewing portions of the segment into which assets can be placed for optimal viewing based on the acuity of the viewer.

Figure 18:
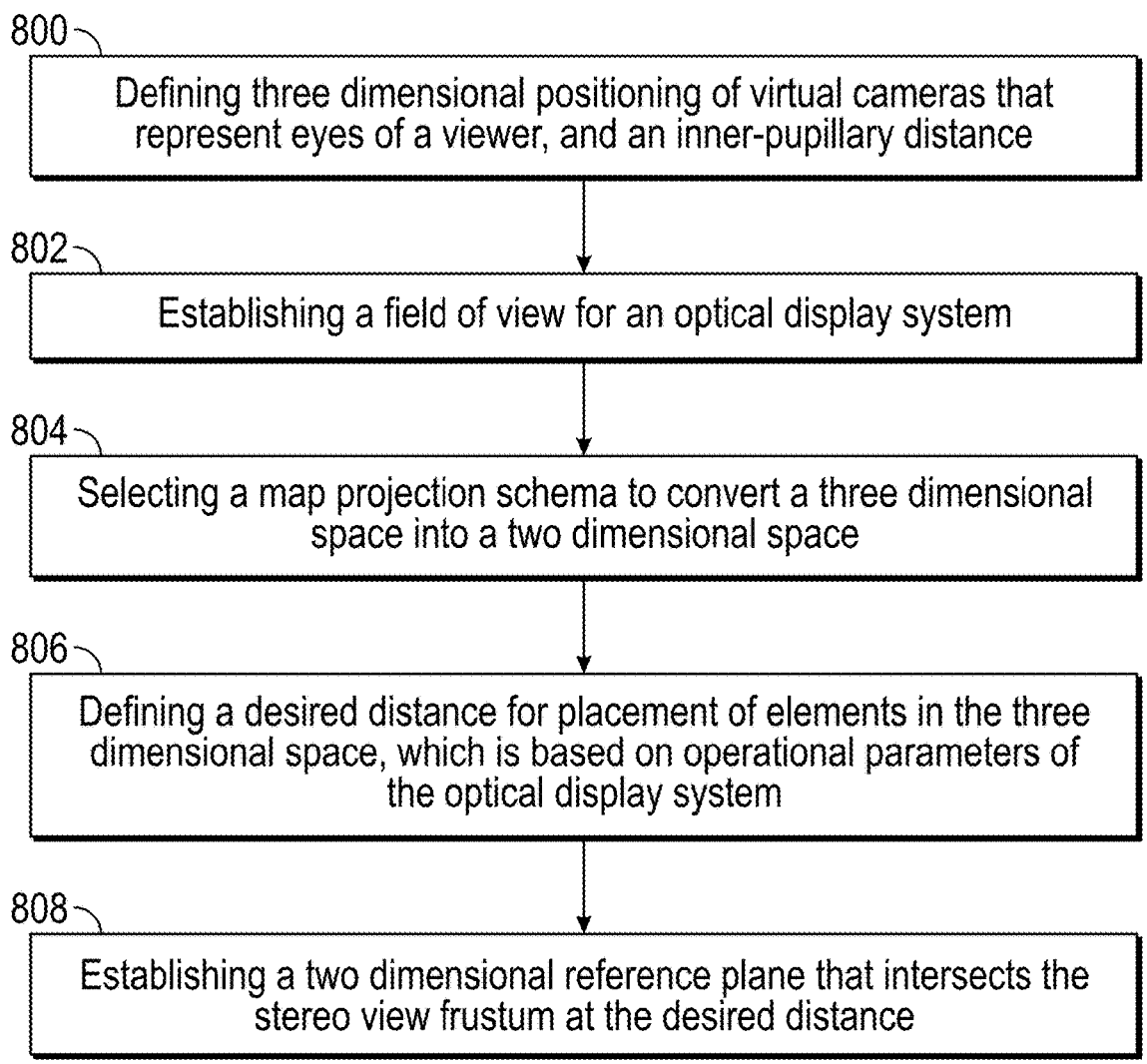
FIG. 18 is a flowchart of an example method for modeling a human head and eyes, as well as a three dimensional environment for display.

Referring now to FIG. 18, which illustrates an example method of the present disclosure. The method comprises a step 800 of defining three dimensional positioning of virtual cameras that represent eyes of a viewer, and an inner-pupillary distance. Next, the method includes a step 802 of establishing a field of view for an optical display system. Again, this can include any optical display system such as an augmented reality or virtual reality device.

In some embodiments, the method comprises a step 804 of selecting a map projection schema to convert a three dimensional space into a two dimensional space and a step 806 of determining a stereo view frustum for the virtual cameras.

In one embodiment, the method comprises a step 806 of defining a desired distance for placement of elements in the three dimensional space, which is based on operational parameters of the optical display system.

In some embodiments, the method includes a step 808 of establishing a two dimensional reference plane that intersects the stereo view frustum at the desired distance, which sets the desired distance referenced in step 806.

The steps of the flowchart of the method of FIG. 18 provide a means for modeling an optical display system and a viewer's head and eyes relative to the optical display system.

Figure 19:
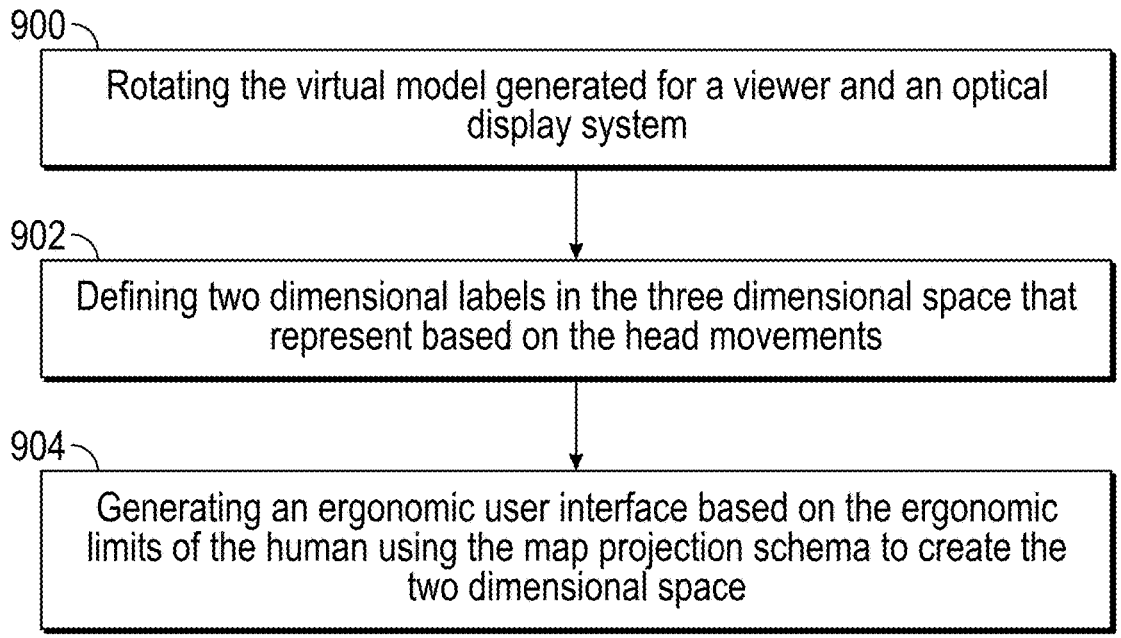
FIG. 19 is a flowchart of an example method for determining ergonomic limits of a human that are used to constrain an ergonomics GUI.

FIG. 19 illustrates another example method for defining ergonomic limits of a human (e.g., viewer). The method begins with a step 900 of rotating the virtual model generated in the method of FIG. 18 in various directions using maximum comfortable head movements.

At each location, the method includes a step 902 of defining two dimensional labels in the three dimensional space that are based on the head movements. For example, maximum left and right head rotation positions and maximum up and down head pivot positions are labeled. Again, these head movements can be tailored to the specific limitations of the viewer, and even individuals with physical limitations.

Next, the method comprises a step 904 of generating an ergonomic user interface based on the ergonomic limits of the human using the map projection schema to create the two dimensional space.

Figure 20:
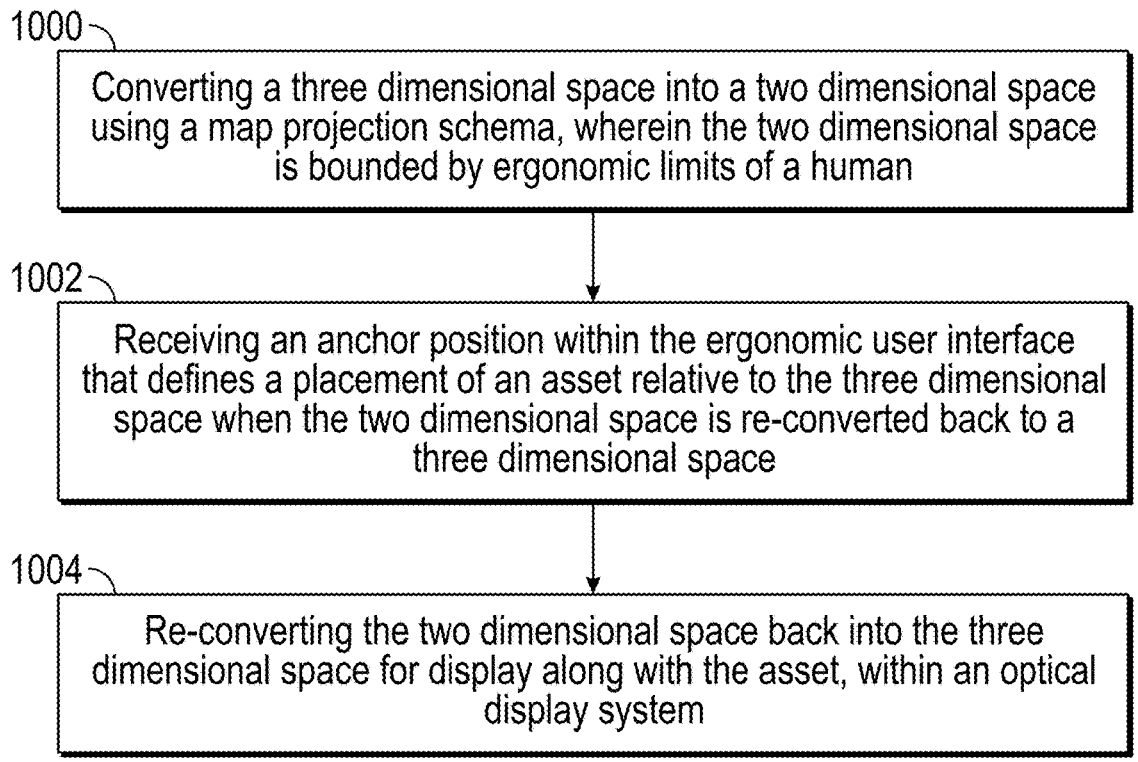
FIG. 20 is a method for converting a three dimensional viewable space into an ergonomics GUI, as well as receiving of an asset within the ergonomics GUI and reconversion of the ergonomics GUI back into a three dimensional viewable space.

FIG. 20 illustrates another method, which includes the creation of a two dimensional space from a three dimensional space and reconversion of the two dimensional space back into the three dimensional space after receiving assets.

In one embodiment, the method includes a step 1000 of converting a three dimensional space into a two dimensional space using a map projection schema. As mentioned above, any map projection schema can be utilized. In some embodiments, the two dimensional space is bounded by ergonomic limits of a human which were determine in the methods of FIGS. 18 and 19, for example.

Next, the method comprises a step 1002 of receiving an anchor position within the ergonomic user interface that defines a placement of an asset relative to the three dimensional space when the two dimensional space is re-converted back to a three dimensional space. For example, the two dimensional space is used to generate the ergonomic user interface that includes a two dimensional image created using the map projection schema. Ergonomic limits are defined on the two dimensional image as various lines that indicate the ergonomic limits.

A developer uses the ergonomic user interface to place the asset for positioning. Once placed, the asset is anchored and then the method includes a step 1004 of re-converting the two dimensional space back into the three dimensional space for display along with the asset, within an optical display system.

Figure 21:
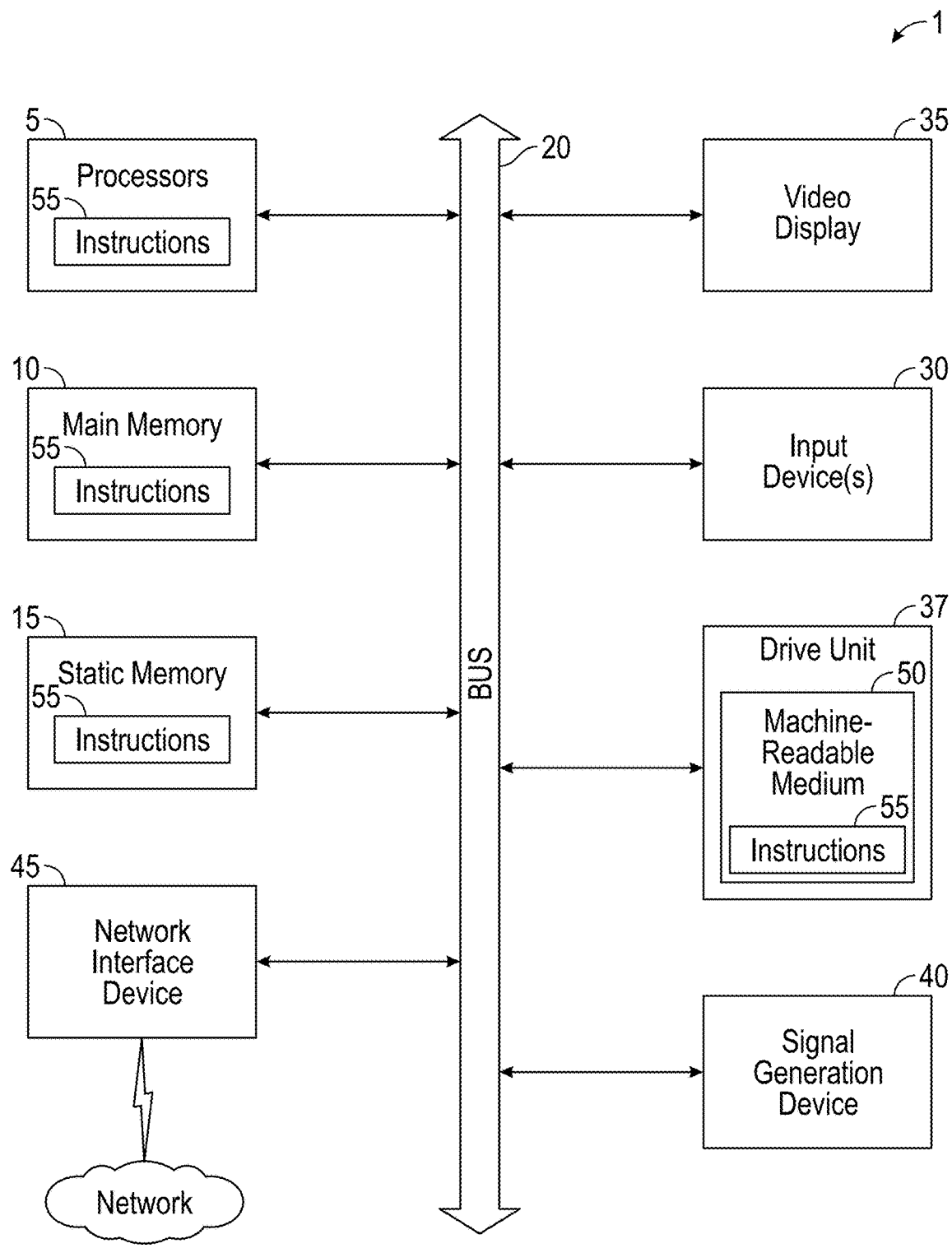
FIG. 21 is an example computing device that can be used to practice aspects of the present technology.

FIG. 21 is a diagrammatic representation of an embodiment of a machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The embodiment of the computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
converting a spherical three dimensional space into a two dimensional space using a map projection schema that includes at least one projection type;
generating, for display, an ergonomic user interface comprising the two dimensional space, wherein the two dimensional space is bounded by ergonomic limits of a human, the ergonomic limits being identified on the two dimensional space using indicia that reference various viewing angles for the human relative to the spherical three dimensional space;
receiving an anchor position within the ergonomic user interface that defines a placement of an asset relative to the spherical three dimensional space when the two dimensional space is re-converted back to a spherical three dimensional space, the anchor position being placed within a space defined by the indicia, the space being indicative of the ergonomic limits of the human, wherein the anchor point ensures that the asset is placed in a line of sight of a viewer;
re-converting the two dimensional space back into the spherical three dimensional space for display along with the asset, within an optical display system; and
displaying the re-converted spherical three dimensional space in the optical display system, the re-converted spherical three dimensional space comprising the asset located in the line of sight of the viewer.

2. The method according to claim 1, further comprising generating the ergonomic user interface that comprises the two dimensional space, wherein the ergonomic user interface comprises:

the asset overlaid upon the two dimensional space; and a plurality of indicia that indicate viewing angles for a viewer that are based on the ergonomic limits that are selected from any of eye rotation, head rotation, natural lines of sight of a viewer, and any combinations thereof.

3. The method according to claim 1, wherein the map projection schema optimizes the two dimensional space for receiving and spatially orienting the asset.

4. The method according to claim 1, further comprising projecting the asset into the optical display system at the anchor point such that the asset, wherein the asset comprises any of a two dimensional object and a three dimensional object.

5. The method according to claim 1, further comprising allowing a designer to toggle between the two dimensional space and the spherical three dimensional space.

6. The method according to claim 5, further comprising generating a virtual model of a head and eyes of the viewer by:
defining three dimensional positioning of virtual cameras that represent the eyes of the viewer and an inner-pupillary distance;
determining a field of view of the optical display system;
selecting the map projection schema;
determining a stereo view frustum;
defining a desired distance for placement of three dimensional elements in the spherical three dimensional space as well as the asset; and
establishing a two dimensional reference plane that intersects the stereo view frustum at the desired distance.

7. The method according to claim 6, wherein the ergonomic limits of head rotation and natural lines of sight of the viewer are determined by:
rotating the virtual model of the head in various directions using maximum comfortable head movements; and
defining two dimensional labels in the three dimensional space that represent: (1) leftmost maximum comfortable head rotation; (2) a rightmost maximum comfortable head rotation; (3) an upward maximum comfortable head tilt; and (4) a lower maximum comfortable head tilt.

8. A method, comprising:
converting a spherical three dimensional space into a two dimensional space using a map projection schema that includes at least one projection type;
selecting coordinates for placement of an asset within a spherical three dimensional rendering of the two dimensional space, wherein the two dimensional space is bounded by ergonomic limits of a human and a model of a three dimensional display generated by an optical display system;
generating, for display, an ergonomic user interface comprising the two dimensional space, wherein the two dimensional space is bounded by the ergonomic limits of a human, the ergonomic limits being identified on the two dimensional space using indicia that reference various viewing angles for the human relative to the spherical three dimensional space;
generating the spherical three dimensional rendering for display within the optical display system using the ergonomic limits and the model, wherein the spherical three dimensional rendering comprises the two dimensional space that has been rendered into the spherical three dimensional space for display along with the asset; and
displaying the asset in combination with the spherical three dimensional rendering at the selected coordinates in such a way that the asset is displayed to the viewer using the optical display system in two dimensions while the spherical three dimensional rendering is displayed to the viewer as a three dimensional image.

9. The method according to claim 8, further comprising allowing a user to toggle between the two dimensional space and the spherical three dimensional rendering.

10. The method according to claim 9, further comprising:
generating a view of the two dimensional space; and
receiving the asset, wherein the selection of the coordinates is determined by placement of the asset onto the two dimensional space.

11. The method according to claim 10, further comprising applying a masking frame to at least a portion of the view of the two dimensional space, wherein the masking frame defines a selected portion of a focal point of the viewer.

12. The method according to claim 8, wherein the asset is displayed in such a way that the asset is coplanar with a reference plane that extends through the spherical three dimensional rendering.

13. The method according to claim 8, wherein the asset is displayed in such a way that the asset at least partially conforms to a shape of the spherical three dimensional rendering.

14. The method according to claim 8, further comprising outputting a location of the asset relative to horizontal and vertical angles of the spherical three dimensional rendering.

15. The method according to claim 8, further comprising determining if a placement of the asset is outside of a visual acuity heat-map.

16. The method according to claim 8, further comprising providing an ergonomic template that is a two dimensional representation of the spherical three dimensional space, which comprises a spherical space covering approximately 120 degrees of horizontal and vertical viewing angles, the spherical space being mapped to a two dimensional space using a map projection schema.

17. The method according to claim 16, wherein the two dimensional image of the spherical space is subdivided into a plurality of sections, further wherein each of the plurality of sections presents a separate field of view of the two dimensional space that can be displayed within the optical display system.

18. The method according to claim 17, further comprising applying a visual acuity heat-map to each of the plurality of sections to determine if the asset mapped to the two dimensional space will be visible when the two dimensional space is converted to the spherical three dimensional rendering for display within the optical display system.

19. A method for generating a virtual model, comprising:
defining three dimensional positioning of virtual cameras that represent eyes of a viewer, and an inner-pupillary distance;
establishing a field of view for an optical display system;
selecting a map projection schema to convert a spherical three dimensional space into a two dimensional space;
determining a stereo view frustum;
defining a desired distance for placement of elements in the spherical three dimensional space;
establishing a two dimensional reference plane that intersects the stereo view frustum at the desired distance;
defining ergonomic limits of a human by:
rotating the virtual model in various directions using maximum comfortable head movements; and defining two dimensional labels in the spherical three dimensional space that are based on the head movements; and generating an ergonomic user interface based on the ergonomic limits of the human using the map projection schema to create a two dimensional space from the spherical three dimensional space, the ergonomic limits being identified on the two dimensional space using indicia that reference various viewing angles for the human relative to the spherical three dimensional space;

re-converting the two dimensional space back into the spherical three dimensional space for display along with the asset, within an optical display system; and displaying the re-converted spherical three dimensional space in the optical display system, the re-converted spherical three dimensional space comprising the asset located in the line of sight of the viewer.

\* \* \* \* \*